(12) United States Patent
Jalla

(10) Patent No.: US 6,445,968 B1
(45) Date of Patent: Sep. 3, 2002

(54) TASK MANAGER

(76) Inventor: Maharaj K. Jalla, 7817 Calpurnia Ct., Mclean, VA (US) 22102

(*) Notice: Subject to any disclaimer, the term of this patent is extended or adjusted under 35 U.S.C. 154(b) by 0 days.

(21) Appl. No.: 09/351,155

(22) Filed: Jul. 12, 1999

(51) Int. Cl.⁷ ............................................... G06F 17/60
(52) U.S. Cl. .......................................... 700/101; 705/9
(58) Field of Search ................................. 709/100, 103, 709/318; 705/7–9; 700/99–104

(56) References Cited

U.S. PATENT DOCUMENTS

| | | | | |
|---|---|---|---|---|
| 5,016,170 A | * | 5/1991 | Pollalis et al. | 705/7 |
| 5,111,291 A | * | 5/1992 | Fields et al. | 705/9 |
| 5,148,370 A | * | 9/1992 | Litt et al. | 700/104 |
| 5,233,533 A | * | 8/1993 | Edstrom et al. | 700/103 |
| 5,406,476 A | * | 4/1995 | Deziel et al. | 705/8 |
| 5,408,663 A | * | 4/1995 | Miller | 709/104 |
| 5,619,695 A | * | 4/1997 | Arbabi et al. | 709/100 |
| 5,671,361 A | * | 9/1997 | Brown et al. | 705/9 |
| 5,692,125 A | * | 11/1997 | Schloss et al. | 705/9 |
| 5,737,728 A | * | 4/1998 | Sisley et al. | 705/8 |
| 5,826,236 A | * | 10/1998 | Narimatsu et al. | 705/8 |
| 5,890,134 A | * | 3/1999 | Fox | 705/9 |
| 5,963,913 A | * | 10/1999 | Henneuse | 705/9 |
| 5,999,911 A | * | 12/1999 | Berg et al. | 705/9 |
| 6,023,572 A | * | 2/2000 | Lautzenheiser et al. | 703/2 |
| 6,026,365 A | * | 2/2000 | Hayashi | 705/9 |
| 6,035,278 A | * | 3/2000 | Mansour | 705/9 |
| 6,049,776 A | * | 4/2000 | Donnelly et al. | 705/8 |
| 6,064,976 A | * | 5/2000 | Tolopka | 705/9 |
| 6,088,678 A | * | 7/2000 | Shannon | 705/8 |
| 6,088,679 A | * | 7/2000 | Barkley | 705/8 |
| 6,101,481 A | * | 8/2000 | Miller | 705/9 |
| 6,122,621 A | * | 9/2000 | Shimada | 705/8 |
| 6,144,955 A | * | 11/2000 | Tsuiki et al. | 707/1 |
| 6,151,583 A | * | 11/2000 | Ohmura et al. | 705/8 |
| 6,256,651 B1 | * | 7/2001 | Tuli | 707/526 |
| 6,278,978 B1 | * | 8/2001 | Andre et al. | 705/9 |
| 6,308,164 B1 | * | 10/2001 | Nummelin | 705/9 |
| 6,349,287 B1 | * | 2/2002 | Hayashi | 705/8 |

* cited by examiner

*Primary Examiner*—St. John Courtenay, III

(57) ABSTRACT

The present invention relates to a process of planning, scheduling and control of the tasks of all members of an organization by an overall manager of the organization through a computer program. In this program, the overall manager feeds in the tasks all of members with each task having parameters that include member's name, start date, estimated time, priority number and weightage number. At the start of any working day, the program processes the tasks of each member in the order of decreasing priority and produces a complete schedule of all uncompleted tasks of the member starting from the same working day. The process also allows new tasks to be added or the parameters of any incomplete previous task of any member to be altered at the start of any subsequent working day before obtaining a complete schedule starting from this subsequent working day.

2 Claims, 3 Drawing Sheets

TASK MANAGER

The present invention relates to a process of planning, scheduling and control of the tasks assigned to all the members of an organization by the overall manager of the organization. This is achieved through the Task Manager computer program.

In complex, interrelated business activities, the manager or the administrator constantly looks forward to those techniques or methods which help him in planning, scheduling and controlling such activities. The concepts of network planning have greatly assisted him. The network approach is a technique through which large projects are broken down to individual jobs or events and arranged in a logical network. These individual jobs are given time estimates for their execution, and the network helps in identifying those jobs or events which control the completion of the project.

PERT and CPM are two such management techniques or tools that have been accepted in recent years. PERT stands for "Program Evaluation and Review Technique", and CPM for "Critical Path Method". Both these tools define and coordinate various activities of a project and accomplish the objectives on time.

In the PERT and CPM network models, one assumption is that the precedence relationships of project activities can be completely represented by a non-cyclical network graph in which each activity connects directly into its immediate successors. All activities in the network must be performed, and in the orders shown.

Though PERT and CPM are useful in the execution of large projects, they cannot be used in the day-to-day management of the tasks of an organization in which predecessor relationships need to be changed or updated frequently.

The primary object of the present invention is to provide an alternative and a more practical method for the management of tasks assigned to various members of an organization. The method enables an overall manager to ensure that various tasks are handled by any member on the same working day. For these various tasks, the concerned member needs to spend only the time duration fixed for each task at the beginning of the working day. No further changes in the time allotment is made during the same working day. The method also allows tasks of varying priorities to be added or altered by the overall manager at the start of any working day with ease. This method is executed through the Task Manager computer program. At the start of any working day, the program schedules all the tasks of all members of the organization till their completion for the required number of working days.

BRIEF DESCRIPTION OF THE FIGURES

The present invention will be more readily understood by reference to the following detailed description when read in conjunction with the attached drawings.

DETAILED DESCRIPTION

Fundamentally, PERT and CPM are techniques of project management useful in the basic managerial functions of planning, scheduling and control. The planning phase of any venture involves a listing of tasks or jobs that must be performed to bring about the venture's completion. Gross requirements for material, equipment, and manpower are also determined in this phase, and estimates of costs and duration for the various jobs are made.

Scheduling, on the other hand, is the laying out of the actual jobs of the project in the time order in which they have to be performed. Manpower and material requirements needed at each stage of production are calculated, along with the expected completion time of each of the jobs. Control begins with reviewing the difference between the schedule and actual performance once the project has begun. The analysis and correction of this difference forms the basic aspect of control.

Figure 1:
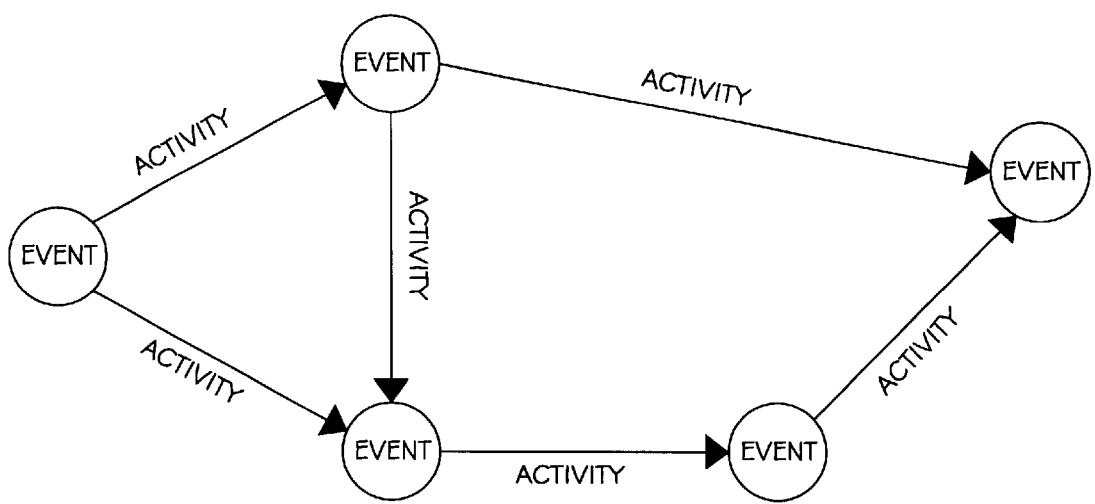
FIG. 1 shows how events are connected by activities in PERT and CPM networks.

There are two basic elements in a network plan. These are the activity and the event, and they are shown in FIG. 1. The activity stands for the time-consuming part of a project. It represents a job or a task. The event, also called a node, on the other hand, is either the beginning or the end of a job. When all the activities and events in a project are connected logically and sequentially, they form a network. Some jobs can be taken up concurrently. In some cases, a job cannot be undertaken until another job is over.

In a network-based management system, the stress could be laid either on the event or on the activity. In a PERT network, the interest is focused upon the start or completion of events rather than on the activities themselves. The activities that take place between the events are not specified. In contrast, CPM puts emphasis on activities. In other words, the PERT network is event-oriented and the CPM network is activity-oriented.

PERT assumes that the activities and their network relationships have been well defined, but it allows for uncertainties in activity times. For each activity in the project network, some measure of uncertainty is noted in the time estimate. To take these uncertainties into account, three kinds of time estimates are generally obtained. They are the optimistic time estimate, the most likely time estimate and the pessimistic time estimate. PERT then calculates the activity time as a weighted average of these three time estimates.

In contrast, CPM is basically concerned with obtaining the trade-off between cost and completion date. CPM emphasizes the relationship between applying more men or other resources to shorten the duration of given jobs in a project and the increased cost of these additional resources. With CPM, the amount of time needed to complete various facts of the project is assumed to be known with certainty; moreover, the relation between the amount of resources employed and the time needed to complete the project is also assumed as known.

Because of these differences, PERT is used more in research and development projects, and CPM is used more in projects such as construction where there has been some experience of handling similar endeavors.

One assumption of the network models is that a project can be subdivided into a set of predictable, independent activities. In other words, the activities comprising a project can be known beforehand. Secondly, predecessor relationships are assumed to be firm, and a given job must be completed in its entirety before any successor jobs can begin.

Though PERT and CPM have undoubtedly helped management in executing large projects, some of their assumptions are inappropriate or insufficient for the planning and scheduling of the day-to-day tasks of an organization. For example, the simple precedence relationship used in the network ("a job must be finished before its successors can begin") is considered by some managers to be too restrictive. They prefer the flexibility afforded by the inclusion of other types of relationship (such as "job A cannot be finished before job B is begun" or "job A cannot be started before job B has been started").

In a large number of cases, it becomes necessary to alter the original plan as the work progresses. Such an alteration may be due to several reasons, for example, change in time schedule because of altered plans in the supply of materials, non-availability of some machines due to breakdown, and availability of additional labor during the progress of work.

The management technique, if it has to remain dynamic, must reflect these modifications. The additional information that is obtained as the work progresses must be incorporated in the planning and scheduling. A dynamic technique should not only show the present state of affairs but also indicate the future course of activity to the management. This technique has been incorporated in the Task Manager program of the present invention.

The chief factor in the success or failure of any management technique is the measure of support they receive from the top management and from the people who use the system. If a system is initiated by the top management or with their clear approval, it has greater assurance of acceptance and success than if a lower-level agency attempts its installation. In the technique of the Task Manager computer program, the control of the progress of all tasks lies with the overall manager.

With this technique, updating can be done more frequently—either at the end of the same working day or at the beginning of the next working day.

In any organization, some people are inclined to be more cautions than others and tend to be more generous in time estimates. This might specially be true if the estimator is also the one who performs or supervises the activity when it occurs and who would be held responsible for a time overrun.

In today's office environment, an exact estimation of the time a job will take is sometimes difficult. There is always a pressure to get the job done in the minimum interval of time. This is the usual impatience of the manager. The person immediately in charge of a particular operation, while being quite willing to put an effort to get it done with minimum delays, unfortunately, is dependent on many uncertainties because of which he is pressed for time in a majority of cases. Even if accurate time data are not available, best guesses, unless completely arbitrary, are useful information and should help a manager to arrive at better time estimates on an average than no guesses at all.

In this technique, the tasks of all members of all departments of an organization are fed in the Task Manager computer program by the overall manager. The parameters that need to be provided for each task are the member's name, start date, estimated time, priority number and weightage number. Start date should never be earlier than the system date of the computer at the time of insertion of the task in the program. Estimated time should not be less than a minute. Priority number is any integer number which is equal to or greater than 1, with the priority value decreasing as the priority number increases. Weightage number is any integer number between 1 and 100, with the weightage value increasing as the number increases.

Figure 2A:
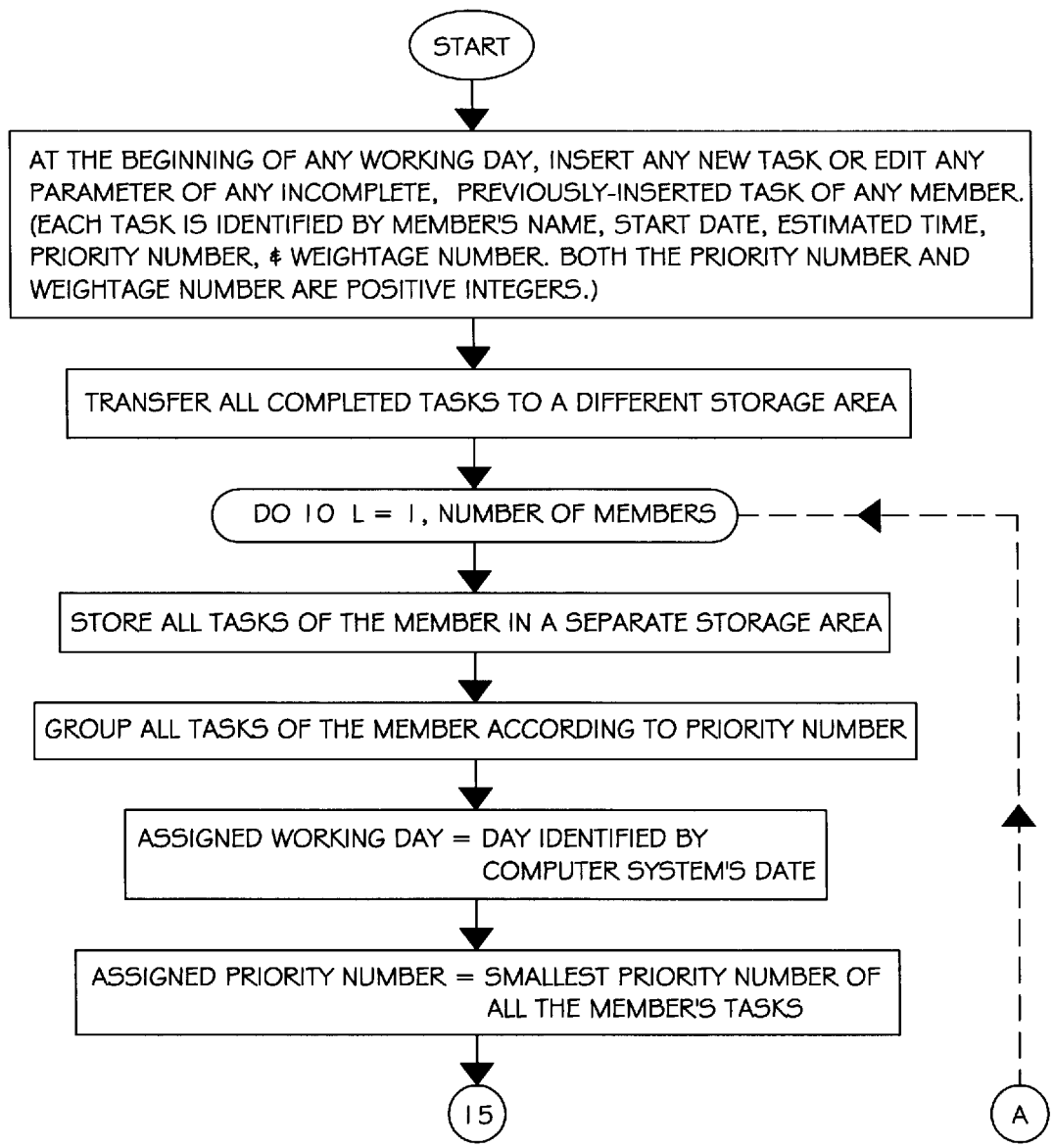
FIGS. 2(a) & 2(b) depict a flowchart indicating the process of planning, scheduling and control of tasks in the Task Manager computer program.
Figure 2B:
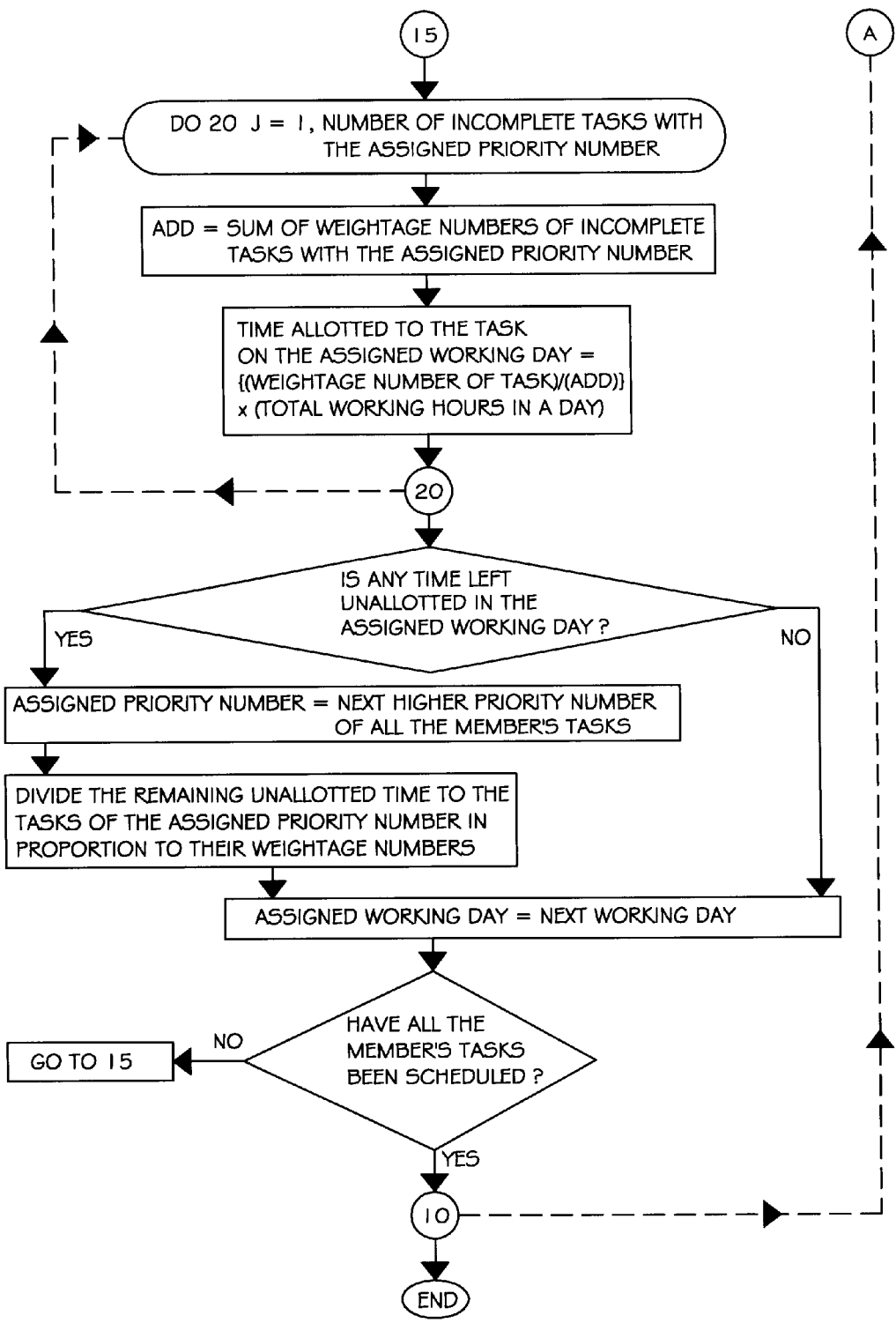

The steps of automatic scheduling of all tasks of all members by the Task Manager computer program have been listed in a flowchart form as shown in FIGS. 2(a) & 2(b). For scheduling the tasks of any member by the computer program, all tasks assigned to each member are stored in a separate storage area. In each storage area, tasks of the same priority are grouped together. At the start of any working day identified by the system date of the computer, for any member, unfinished tasks of the highest priority value are the ones to be attended on that particular working day.

For each member, the computer program allots a part of the total working hours of the day to all the tasks of the highest priority value in the following manner. The weightage numbers of all the tasks of the highest priority number are summed up. This sum can be greater than 100. The weightage number of any task having this priority value is divided by this sum and then multiplied by the total working hours of the day to determine the time allotted to the particular task. The concerned member then attends to all the day's tasks by spending only the allotted time. At the end of each day, the time spent on each task is subtracted from the remaining estimated time.

If in any particular day, any working time is left after allotment to the tasks of the highest priority value, then that time is distributed to all the tasks of the next lower priority value. In this manner, scheduling of all the tasks of any member is done by the computer program for the required number of working days.

One of the attractive features of this technique is that more tasks of any member can be inserted in the program by the overall manager at the end of the working day or at the beginning of the next working day. In addition, incomplete tasks can also be removed from the scheduling and transferred to a tasks pool. Moreover, the parameters of any incomplete previously-inserted task can be changed. This allows the overall manager to monitor progress of the plans and objectives of the organization and to take appropriate action when needed. All other members of the organization need to be concerned with their own tasks of the day and sticking to the allotted time of each of them. Each member can report the progress of his tasks at the end of the initial estimated time.

Further down the organizational ladder, this approach is useful to the members of the organization at the operating level in helping them to understand the sequencing of jobs and the necessity of pushing those that are critical. They can more readily see the relationship of activities for which they are responsible.

No management tool is a solution to all bad management problems, as the tool cannot itself make decisions. However, tools such as the present Task Manager program can provide a management with information of the progress of various tasks based on which better decisions can be made.

While specific details have been set forth for the purpose of describing the novel features of the invention, it should be recognized that such specifics can be varied without departing from the principles of the invention. Therefore, in determining the scope of the present invention, reference shall be made to the appended claims.

What claimed is:

1. A process of scheduling a plurality of tasks of any member of an organization through a computer program, comprising the steps of:

inserting start date, estimated time, priority number and weightage number of each of said tasks of the member, said each start date not earlier than the system date of the computer at the time of insertion, said each estimated time not being less than a minute, said each priority number being an integer number equal to or greater than one, with the priority value of said priority number decreasing as said priority number increases, said each weightage number being an integer number between one and hundred;

storing all said tasks in a separate storage area, with the tasks of same said priority value being grouped together; and allotting time to all said tasks from the beginning of any initial working day by assigning said initial working day as current working day, and by also assigning the greatest priority value of all said tasks as current priority value, and then by following steps that comprise:

(a) summing up the weightage numbers of the tasks with the current priority value, (b) dividing the weightage number of each of the tasks with the current priority value task with the sum of the weightage numbers of the tasks with the current priority value, and then multiplying with the total working hours of the current working day so as to obtain the time allotted to corresponding said each task in the current working day, (c) assigning the following working day as the current working day and repeating steps (a) and (b) till all the tasks of the current priority value have been scheduled, (d) assigning the next lower priority value of all said tasks as the current priority value, and dividing any unused working hours of the current working day to the tasks of the current priority value by following the procedure of steps (a) and (b), (e) assigning the next working day as the current working day, and repeating steps (a) to (e) as many times as required until all said tasks are scheduled in working days that follow said initial working day, thereby producing a complete schedule of all said tasks of said member starting from said initial working day.

2. A process of scheduling a plurality of tasks of any member of an organization through a computer program as in claim 1, wherein additional tasks of the member can be inserted or the parameters of any incomplete, previously-inserted task can be altered at the start of any initial working day before allotting time for producing a complete schedule of all said tasks from said initial working day.

* * * * *